G. E. STANSBURY & H. H. HUTCHISON.
SHAFT SUPPORT.
APPLICATION FILED JUNE 4, 1909.
943,576.
Patented Dec. 14, 1909.
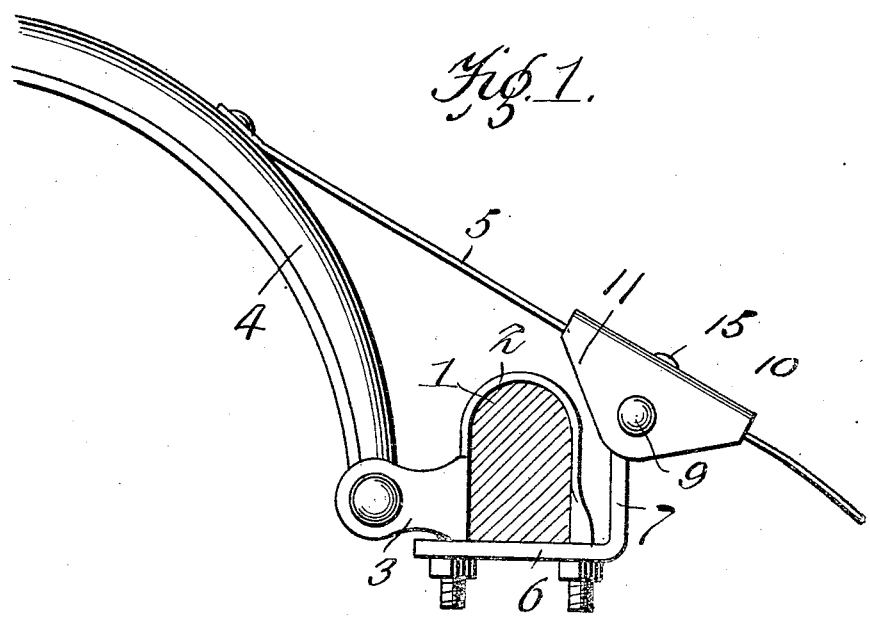
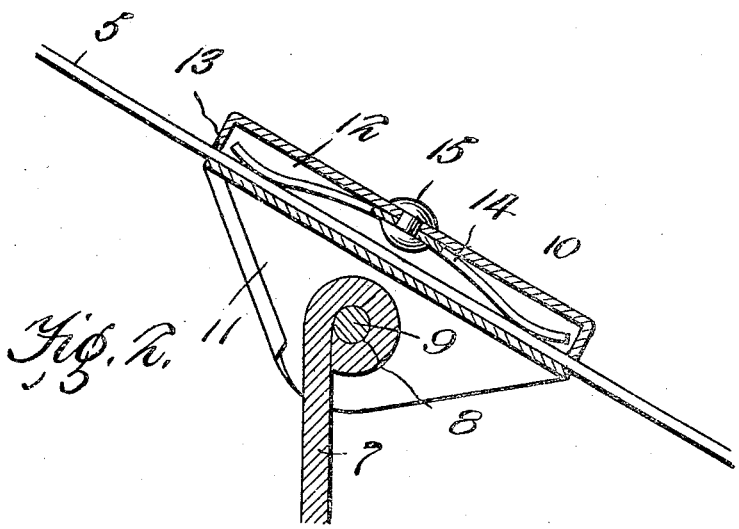
Witnesses
Hugh H. Ott
Wm. ...
Inventors
George E. Stansbury
Harry H. Hutchison,
By Victor J. Evans
Attorney

UNITED STATES PATENT OFFICE.

GEORGE EDWARD STANSBURY AND HARRY HANCOCK HUTCHISON, OF CATLIN, ILLINOIS.

SHAFT-SUPPORT.

943,576.  Specification of Letters Patent.   Patented Dec. 14, 1909.

Application filed June 4, 1909. Serial No. 500,101.

*To all whom it may concern:*

Be it known that we, GEORGE EDWARD STANSBURY and HARRY HANCOCK HUTCHISON, citizens of the United States, residing at Catlin, in the county of Vermilion and State of Illinois, have invented new and useful Improvements in Shaft-Supports, of which the following is a specification.

This invention relates to shaft supports, the primary object of the invention being to provide a simple, cheap and effective device of this character, which is integrally formed upon a shaft and axle and which will support the shaft at any desired inclination.

With the above and other objects in view, which will be more apparent as the description progresses the invention resides in the novel construction and combination of parts hereinafter fully described and claimed.

In the accompanying drawing, we have illustrated a simple and preferred embodiment of the invention, as it now appears to us, and in which, Figure 1 is a side elevation of the device, the axle being shown in section. Fig. 2 is a detail enlarged vertical section.

In the accompanying drawing the numeral 1 designates the axle of an ordinary vehicle. This axle 1 is provided with the usual U-shaped clip 2 having forwardly projecting ears 3 provided with suitable perforations and which are adapted for the reception of bolts whereby the thill 4 is attached to the axle. The thill or shaft in the presence instance is provided with a rearwardly extending bar 5 constructed of suitable metal and adapted for a purpose hereinafter to be described.

Connected below the axle 1 through the medium of suitable retaining elements engaging the threaded projections of the clip 2 is a substantially L-shaped member 6. This L-shaped member has its vertical arm 7 bent upon itself to provide an eye 8, and this eye is adapted for engagement with a removable bolt 9 carried by a housing 10. The member or housing 10 is of a substantially V-shaped formation, being provided with spaced sides 11 and having its upper portion provided with a compartment 12. The end walls of the compartment 12 are each provided with suitable openings 13 whereby the plate 5 may be inserted through the compartment. The compartment 12 is also provided with a flat resilient element 14 preferably centrally secured to the top of the compartment through the medium of a retaining element 15, and this flattened resilient element is adapted to exert downward pressure at each of its ends and to contact the plate 5 so as to retain the same in any desired position with regard to the angle at which the thill 4 is swung.

From the above description, taken in connection with the accompanying drawing it will be noted that we have provided a simple and thoroughly effective device for retaining the shaft at any desired angle and it will be further noted that with this construction the rattling of the thills is compensated for if not entirely overcome.

Having thus fully described the invention what is claimed as new is:

1. In combination with an axle provided with the usual clip and a thill hingedly connected with the clip, of a rearwardly extending plate upon the thill, a member pivotally connected with the axle having its upper portion provided with a compartment, said compartment having its opposite ends provided with openings adapted for the reception of the plate, and resilient means for retaining the plate in an adjusted position within the compartment.

2. The combination with an axle provided with a hinged thill, a rearwardly extending plate secured to the thill, an L-shaped member upon the axle, said member having its vertical arm provided with an eye, a member having spaced sides pivotally secured to the eye, said member having its upper portion provided with a compartment, a compartment having its opposite ends provided with openings adapted for the reception of the plate of the thill, and a flattened resilient element secured to the top of the compartment and adapted to have its opposite ends engage the plate of the thill.

In testimony whereof we affix our signatures in presence of two witnesses.

GEORGE EDWARD STANSBURY.
HARRY HANCOCK HUTCHISON.

Witnesses:
HENRY JONES, Jr.,
ROBERT WHITE.